United States Patent
Rhodes et al.

[11] Patent Number: 5,426,343
[45] Date of Patent: Jun. 20, 1995

[54] SEALING MEMBERS FOR ALUMINA ARC TUBES AND METHOD OF MAKING THE SAME

[75] Inventors: William H. Rhodes, Lexington; Alfred E. Feuersanger, Framingham; Rodrigue Thibodeau, Marblehead, all of Mass.

[73] Assignee: GTE Products Corporation, Danvers, Mass.

[21] Appl. No.: 945,556

[22] Filed: Sep. 16, 1992

[51] Int. Cl.$^6$ .................. H01J 17/18; H01J 61/36
[52] U.S. Cl. .................. 313/623; 313/624; 313/625; 313/636; 501/152; 501/153
[58] Field of Search .......... 313/623, 624, 625, 636; 501/152, 153

[56] References Cited

U.S. PATENT DOCUMENTS

| | | | |
|---|---|---|---|
| 3,281,309 | 10/1966 | Ross | 161/196 |
| 3,363,134 | 1/1968 | Johnson | 313/220 |
| 3,428,846 | 2/1969 | Rigden et al. | 313/284 |
| 3,441,421 | 4/1969 | Sarver et al. | 106/39 |
| 3,448,319 | 6/1969 | Louden | 313/221 |
| 3,588,573 | 6/1971 | Chen et al. | 313/623 X |
| 3,711,585 | 1/1973 | Muta et al. | 264/65 |
| 4,004,173 | 1/1977 | Rigden | 313/317 |
| 4,336,410 | 12/1982 | Buhrer | 313/221 |
| 4,373,030 | 2/1983 | Kaneno et al. | 313/636 X |
| 4,537,323 | 8/1985 | Ditchek et al. | 220/2.1 R |
| 4,545,799 | 10/1985 | Rhodes et al. | 65/59.21 |
| 4,762,655 | 8/1988 | Rhodes et al. | 264/65 |
| 4,797,238 | 1/1989 | Rhodes et al. | 264/65 |
| 5,057,048 | 10/1991 | Feuersanger et al. | 445/44 |
| 5,095,246 | 3/1992 | Feuersanger et al. | 313/623 |

Primary Examiner—Sandra L. O'Shea
Assistant Examiner—Matthew J. Esserman
Attorney, Agent, or Firm—Carlo S. Bessone

[57] ABSTRACT

Alumina arc tube sealing members including a highly pure, fine alumina doped with yttrium oxide, and magnesium oxide. The sealing members are used in the formation of sintered hermetic seals to a green, prefired, or fully sintered translucent alumina arc tube and niobium electrical feedthrough assemblies with or without the use of sealing frits or brazing alloys.

3 Claims, 2 Drawing Sheets

SEALING MEMBERS FOR ALUMINA ARC TUBES AND METHOD OF MAKING THE SAME

BACKGROUND OF THE INVENTION

1. Field of the Invention

The present invention relates to sealing members for polycrystalline ceramic bodies and, more particularly, to sealing member compositions for high pressure discharge lamps composed of alumina.

2. Description of the Prior Art

Electrical discharge devices, such as high pressure sodium (HPS) vapor arc lamps, commonly utilize transparent or translucent high temperature refractory tubes composed of alumina or yttria. Alumina is a preferred lamp envelope material in current commercial practice. Within the alumina tube, an arc discharge extends between two tungsten electrodes to which current is conducted by a hermetically sealed feedthrough assembly.

Because alumina and niobium metal have nearly equal thermal coefficients of expansion, a niobium tube or a niobium wire is typically used in HPS lamps to conduct electrical current through the ends of the alumina arc tube. Tungsten electrodes are welded to the niobium tube. Generally, the niobium feedthrough tube extends through an axial opening in sealing members, which are hermetically sealed to and close each end of the alumina arc tube. The niobium feedthrough is hermetically sealed to the sealing member by a frit or braze seal. Thus, the feedthrough assembly not only seals the discharge tube but also conducts electrical current through the end of the alumina arc tube.

The interface between the niobium metal feedthrough and the alumina sealing member is typically filled with a ceramic, meltable sealing frit, which forms a hermetic seal. Several types of sealing frits have been disclosed. For example, a ceramic frit consisting of $Al_2O_3$-$CaO$-$MgO$-$BaO$ is described by Ross in U.S. Pat. No. 3,281,309; and a composition of calcia, magnesia, and alumina is described by Sarver et al. in U.S. Pat. No. 3,441,421. Under normal frit processing conditions however, the feedthroughs exhibit grain growth and recrystalization which affect their ductility, thereby causing premature cracking and limiting lamp life.

Another method to hermetically seal the feedthrough within the sealing member, on a production basis, includes brazing with eutectic metal alloys. These seals are described by Rigden et al. in U.S. Pat. No. 3,428,846 and by Rigden in U.S. Pat. No. 4,004,173, wherein alloys of niobium, titanium, vanadium, and zirconium are utilized. These seals are no longer favored, however, due to long-term embrittlement of the niobium feedthroughs caused by processing temperatures and atmospheres.

Both of the above sealing methods limit the arc tube end temperature (commonly called the "cold spot temperature") to 800° C., due to the softening temperature of the sealing frits or sealing alloys. Also, sodium or other lamp fill material may react with the sealing frit or alloy, thereby limiting lamp life. The latter reaction rate would naturally increase with any increase in the cold spot temperature. Eliminating the frit in the seal would prevent this type of life-limiting reaction and allow for higher cold spot temperatures, thereby permitting altogether new low vapor pressure lamp chemistries.

A direct niobium-to-ceramic sealed lamp is described in U.S. Pat. No. 4,545,799 to Rhodes et al, which is incorporated herein by reference. The assembled sealing members, or inserts, and arc tube are partially sintered, the niobium feedthroughs are inserted into the axial openings in the inserts, and the assembly is fully sintered to translucency, forming a seal as the insert material shrinks during the sintering process.

A similar sealing method is described in U.S. Pat. No. 5,057,048 to Feuersanger et al., which refers to other alumina- or yttria-based materials, suitable for lamp fabrication, in the sealing members that allow the lamp assembly to have a pinched-off, ductile feedthrough as well as providing for a sealing process for achieving the required ductility at the outer end of the feedthrough.

Sintering aids, such as yttrium oxide and magnesium oxide, are disclosed in U.S. Pat. No. 3,711,585 to Muta et al. and U.S. Pat. Nos. 4,762,655 and 4,797,238 to Rhodes et al. for producing translucent, light-transmitting $Al_2O_3$-based lamp tubes. These additives enhance the sintering rate, and inhibit pore-entrapping grain growth in sintering of $Al_2O_3$ to translucency. These additives, however, react with $Al_2O_3$ at high temperatures to form second phases, $Y_3Al_5O_{12}$ and $MgAl_2O_4$. These phases scatter light when they form in a $Al_2O_3$ body. Consequently, only minimal concentrations of the additives necessary to enhance sintering can be employed in the production of translucent $Al_2O_3$ arc tubes. Higher concentrations inhibit light transmission, thereby degrading an essential characteristic of the $Al_2O_3$ arc tube.

Arc tubes for arc discharge lamps, such as the HPS lamp, are often fabricated with an internal washer or insert. The insert, nominally the same composition as the arc tube, is placed inside the tube at each end in the unfired, or green, state. The starting powder particle size or prefiring of the insert is adjusted such that the arc tube shrinks onto and over the insert with 3-10% interference. This differential shrinkage forces the two components together to form a bond and to seal the parts together by solid state sintering. The classic hermetic seal required for long-life lamps is formed by adding to the arc tube and insert a second external $Al_2O_3$ washer of the same composition as the arc tube. A ceramic sealing frit is used to seal the washer and the insert to the electrode assembly. This construction appears to operate satisfactorily in lamps that require only low cold spot or end temperatures of about 700° C., but is expensive due to the extra washer and sealing frit. The mercury-sodium amalgam temperature for maximum efficacy is within the range from about 615° C. to 750° C. depending on the sodium to mercury ratio (amalgam ratio) and the arc tube end diameter (cold spot).

Another possible lamp construction scheme eliminates the external, or top washer. This scheme is less expensive and therefore highly desirable. The major difficulty is that, without the use of the external washer/frit combination, the insert must form a hermetic seal with the arc tube wall that will last the life of the lamp, typically 24,000 hours. This requires the utmost control of the smoothness of the inside diameter of the arc tube and the outside diameter of the insert, so that no through grooves or voids are retained after sintering. Further, the shrinkage rates of the components must be controlled carefully to insure good bonding between components. If too low an interference fit is experienced, bonding is incomplete and hermeticity is not achieved. No void should extend over $\frac{1}{3}$ of the insert's thickness. Conversely, if too high an interference fit is experienced, the strain associated with the interference fit causes cracking of the arc tube. Thus, the conditions for a successful hermetic seal are difficult to achieve and, if not met, can result in a higher than acceptable reject rate, or premature failure.

It is therefore an object of the present invention to provide an alumina arc tube sealing member composition which permits fabrication of electrical discharge lamps including a cap seal or a hermetic insert washer with or without the use of sealing frits or brazing alloys. It is a further object of the present invention to provide an alumina arc tube sealing member composition which permits formation of sintered hermetic seals to a green, a prefired or a fully sintered translucent alumina arc tube simplifying the subsequent frit sealing of niobium feedthrough assemblies into highly reliable lamps.

SUMMARY OF THE INVENTION

According to the present invention, there are provided alumina arc tube sealing members comprising between about 95.0 to about 99.9 percent by weight of highly pure fine alumina doped with between about 0.1 to about 5.0 percent by weight of yttrium oxide, and between about 0.01 to about 0.5 percent by weight of magnesium oxide. The sealing members may be used in the formation of sintered hermetic seals to a green, a prefired, or a fully sintered translucent alumina arc tube with or without the use of sealing frits or brazing alloys.

The sealing members are prepared by mixing concentrations of from 0.1 to 5.0 percent by weight $Y_2O_3$ and 0.01 to 0.5 percent by weight MgO with high purity $Al_2O_3$ powder. Sealing members, such as cap seals are then formed from the mixture. These members are provided with an axial hole for receipt of a niobium feedthrough. The unsintered sealing member is placed onto fully sintered translucent alumina arc tube. On a fully sintered $Al_2O_3$ arc tube and Nb feedthrough, interference fits of between about 4% to about 14% are provided upon sealing, at both $Al_2O_3/Al_2O_3$ and $Al_2O_3$/Nb interfaces. Sealing cycles for sealing $Al_2O_3$ arc tubes with the sealing members utilize temperatures between about 1640° C. to about 2050° C. for a period of time sufficient to obtain a high-density, hermetically tight sintered cap, and sufficient bonding at each interface to achieve a long-life hermetic seal.

Hermetic insert washers, containing similar quantities of $Y_2O_3$ and MgO additions to high purity $Al_2O_3$, may also be formed in accordance with standard forming techniques, such as cold pressing or machining. These inserts are hermetically sealed to alumina tubes during the alumina tube sintering cycle, which is 1750° C. to 1900° C. for 1 to 5 hours in a hydrogen atmosphere. The niobium electrode assembly in this case is hermetically sealed with standard frit technology without the use of external sealing washers.

BRIEF DESCRIPTION OF THE DRAWINGS

The foregoing and other objects and advantages will be more fully appreciated from the following drawings in which.

DETAILED DESCRIPTION OF THE INVENTION

The present invention provides alumina arc tube sealing members used in the formation of sintered hermetic seals, with or without the use of sealing frits or brazing alloys.

Figure 1:
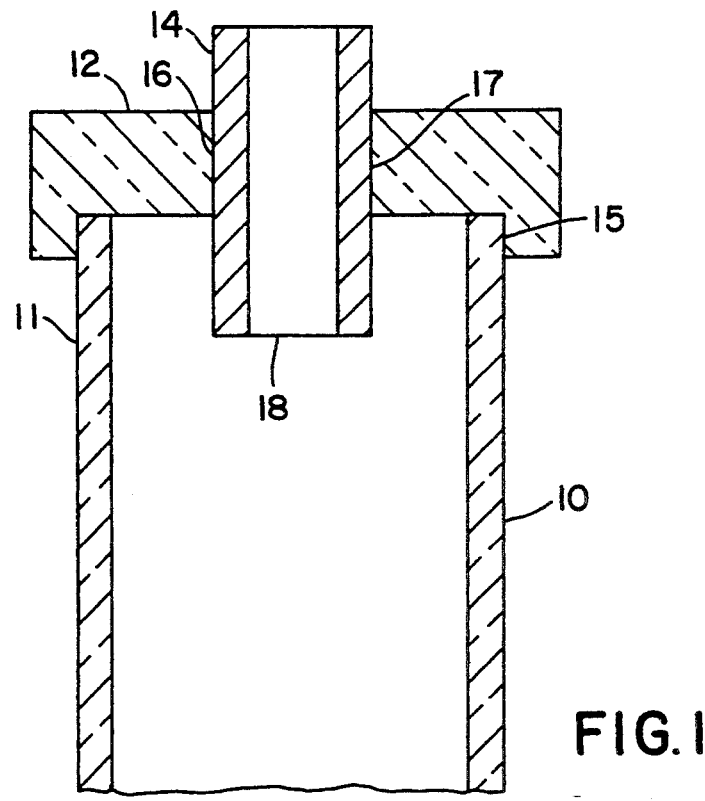
FIG. 1 illustrates in cross-sectional detail one end of a high pressure arc tube assembly utilizing a cap seal.
Figure 2:
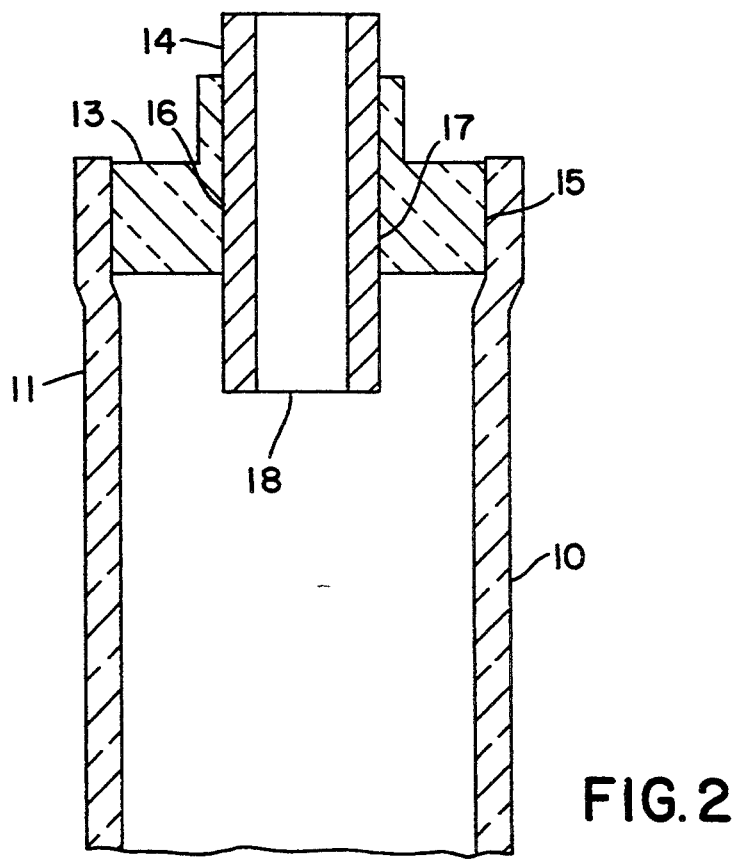
FIG. 2 illustrates in cross-sectional detail one end of a high pressure arc tube assembly utilizing an insert seal.
Figure 3:
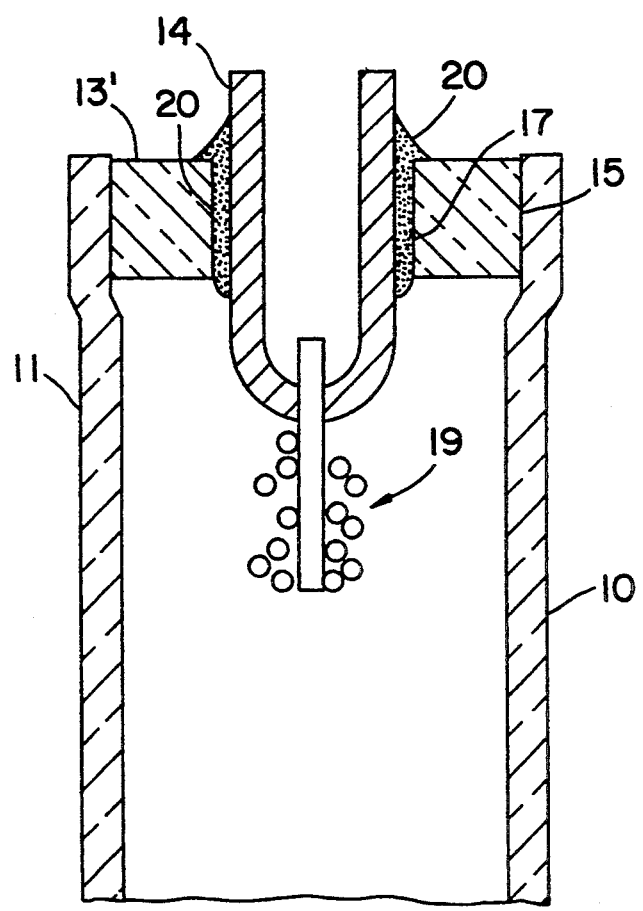
FIG. 3 illustrates in cross-sectional detail one end of a high pressure arc tube assembly with a niobium feedthrough assembly hermetically sealed with standard frit technology.

Referring to the drawings, a fritless seal is constructed as shown in FIGS. 1 and 2. FIG. 3 illustrates a seal made with sealing frits. The figures illustrate a first end of a high pressure arc discharge lamp tube assembly 10, wherein the opposite end is identical or similar. The envelope of assembly 10 is a transparent alumina tube 11. Each end of tube 11 is sealed by a sealing member, which may be formed into a cap seal 12 as shown in FIG. 1, or a sealing insert 13, 13' as shown in FIGS. 2 and 3. Sealing members 12, 13, 13' support a cylindrical metal feedthrough 14. An interface 15 between tube 11 and sealing member 12, 13, and 13' is direct without the use of sealing frits or brazing alloys, while an interface 16 between sealing member 12, 13 and feedthrough 14 may be direct or, as in FIG. 3, hermetically sealed by standard frit technology.

Sealing members 12, 13 and 13' are preferably made from a compressed mixture of between about 95.0 to about 99.9 percent by weight of highly pure fine alumina doped with between about 0.1 to about 5.0 percent by weight of yttrium oxide, and between about 0.01 to about 0.5 percent by weight of magnesium oxide. The composition is cold pressed, or machined into either a cap seal 12 or a sealing insert 13, 13' with an axial hole 17. Upon sintering, the volume of the sealing member 12, 13 and 13' decreases. Accordingly, both its outer and inner diameter decreases. The dimensions of the unsintered sealing member 12, 13 and 13' are selected in relation to the dimensions of the ceramic tube 11; specifically, the outside diameter of the tube when employing cap seal 12, or the inside diameter of the tube when using sealing insert 13, 13'. In addition, the outside diameter of feedthrough 14 is considered. As is known in the art, the differential shrinkage of the components upon sintering causes an interference fit in which the components are forced together to form a bond. Typically, sealing members 12, 13 and 13' have an interference fit of between about 4 to about 14 percent with both tube 11 and feedthrough 14. Preferably, interface 15 has between 4 and 8 percent interference fit with tube 11, while interface 16 has between 5 and 9 percent interference fit with feedthrough 14. Most preferably, interface 15 and interface 16 have interference fits of 4 percent and 5 percent with their respective components, which provides hermetic seals and reduces strain.

The materials of the tube 11 and sealing members 12, 13, 13' are selected to have similar thermal expansion coefficients and to be chemically compatible. Typically, tube 11 is a polycrystalline alumina (PCA) arc tube. Standard PCA typically contains about 0.035 percent by weight yttrium oxide and 0.05 percent by weight magnesium oxide as sintering aids. Some PCA is sintered containing only magnesium oxide sintering aids. Sealing member 12, 13, 13' compositions are selected based on microstructure, reactivity, and bonding with the PCA arc tube 11 and feedthrough 14. Preferably, sealing members 12, 13, 13' include between about 0.1 to 5.0 percent by weight yttrium oxide and about 0.01 to about 0.5 percent by weight magnesium oxide with high purity (greater than 99.8 percent) alumina powder. More preferably, when forming cap seals 12, between about 1.0 to 5.0 percent by weight yttrium oxide and between about 0.02 to 0.25 percent by weight magnesium oxide are mixed with alumina powder. Most preferably, between about 2.0 to 3.0 percent by weight yttrium oxide and between about 0.05 to 0.1 percent by weight magnesium oxide are mixed with alumina powder. When forming sealing inserts 13, 13', however, similar compositions give the arc tube 11 an opaque appearance due to the formation of light scattering second phases, which migrate into the PCA arc tube wall, as described below. Therefore, compositions having between about 0.10 to 0.5 percent by weight yttrium oxide and 0.02 to 0.25 percent by weight magnesium oxide with alumina powder are preferred for formation of sealing inserts 13, 13'. Most preferably, sealing inserts include between about 0.15 to 0.25 percent by weight yttrium oxide and between about 0.05 to 0.1 percent by weight magnesium oxide with alumina powder.

The sealing members 12, 13, 13' are typically formed by cold pressing or machining the sealing member composition powders into the desired size and shape. It is noted that other means may be used to form the sealing member. Once formed, the unsintered sealing member is either placed onto or inserted into, each end of the unsintered, or prefired, PCA arc tube 11. The assembly is heated until both tube 11 and sealing member 12, 13, 13' are partially sintered. This procedure results in a bond at interface 150 It is noted that the unsintered sealing member 12 may also be used with an alumina arc tube 11 which has been fully sintered.

The cylindrical metal feedthrough 14 is then positioned directly in axial hole 17 running through sealing member 12, 13, 13' with or without the use of sealing frits or brazing alloys. Niobium metal is the preferred material of construction for the cylindrical metal feedthrough 14 because it is refractory, chemically compatible with alumina, and has a similar thermal expansion coefficient to alumina. When not using a sealing frit, the feedthrough 14 is temporarily held in place while assembly 10 is heated until both tube 11 and sealing member 12, 13 are fully sintered. The diameter of sealing member 12, 13 continues to contract during the sintering operation, and the inner surface of sealing member 12, 13 is forced against feedthrough 14. The sealing member deforms at a lower flow stress than the niobium feedthrough 14 and so is deformed slightly and bulges out at the interface 16 forming a fritless, brazeless hermetic seal. There appears to be both a mechanical and diffusion bond.

Alternatively, standard frit technology may be used to seal niobium feedthrough 14 within sealing member 13'. Typically, a ring of sealing material 20 is placed around axial hole 17. Niobium feedthrough 14, with electrode assembly 19 in place, is positioned through the sealing member 13' into tube 11. The sealing material 19 is typically a ring pressed from a meltable frit based on calcium aluminate. Compositions useful as sealants for alumina are well known in the art and have been used in conjunction with niobium feedthrough assemblies. The assembly is then heated in the feedthrough region to about 1400° C. to melt the sealing material 20 and cause it to flow into the spaces between the feedthrough 14 and the sealing member 13', thereby providing a hermetic seal.

During the sintering operation, the tube, sealing member and feedthrough are heated at the temperature and time normally used to sinter the type of ceramic materials used in the tube 11 and sealing member 12, 13, 13'. For alumina, a typical sealing cycle for high pressure discharge lamp making is about 1,800° C. for 10 minutes in an ultra-high purity argon atmosphere. It is noted, however, that in the present sealing member compositions, at temperatures above 1,640° C. a ternary eutectic forms, resulting in a small and controlled concentration of a liquid phase which flows and fills gaps between the components, reacts slightly with them, and forms a strong hermetic chemical bond. This controlled liquid formation is somewhat analogous to using sealing frits, in that the liquid readily fills small gaps, crevices, depressions or microcracks, being drawn into them by surface forces known as capillary action. The liquid enhances grain growth, and promotes a continuous microstructure across the original interface. In the final sintered product, the microstructure is continuous from sealing member 12, 13, 13' through the PCA arc tube 11, and it is impossible to delineate the original interface 15. This permits fabricating an arc discharge lamp capable of a high cold spot temperature. Further, it is possible to design with less interference fit, which reduces the loss due to arc tube cracking. Therefore, other sealing temperatures would work as long as the ternary yttrium oxide-magnesium oxide-alumina eutectic temperature of 1,640° C. was exceeded and the alumina melting temperature of 2,050° C. was not exceeded. The sealing time is adjusted with the sealing temperature, within the above-noted range, to accomplish the dual objectives of obtaining a high-density, hermetically tight sintered sealing member and a sufficient bond at each interface to achieve a long life hermetic seal.

The furnace atmosphere during the sintering is selected not only for the ceramic components, but also to limit embrittlement of the niobium feedthrough In a preferred embodiment the furnace atmosphere is either vacuum, nitrogen-hydrogen, or hydrogen.

For a high intensity discharge lamp application, such as in a high pressure sodium lamp, the arc tube sealing member 12, 13, 13' must be equipped with an electrode assembly (not shown in FIGS. 1 and 2). To fabricate the completed seal, an electrode assembly is hermetically welded into the end of a niobium tube (not shown in FIGS. 1 and 2) that is welded into the niobium feedthrough 14. The feedthrough 14 has an axial hole 18 into which the electrode assembly is inserted. Typically, the electrode assembly is fitted with a tungsten coil impregnated with a barium-calcium-tungstate electron emissive coating. The slip-fit electrode assembly is inserted into the niobium feedthrough 14, with the electrode tip portion in the arc tube 11, and positioned to give the proper back spacing of the electrode. A hermetic seal is formed by welding the assembly together. The niobium to niobium weld is typically made by an electron beam welder under vacuum. The beam current is kept sufficiently small to heat the niobium tube locally and to keep the molten zone as small as possible. The secondary heating of the niobium to alumina seal is minimal. The arc tube 11 is typically held in a rotating chuck, or in a similar manner during the niobium to niobium welding operation. This weld could alternatively be produced by well controlled tungsten inert gas (TIG) welding, or by laser welding in an inert, dry, oxygen-free atmosphere. In an alternative construction, as shown in FIG. 3, an electrode assembly 19 may be hermetically welded directly to the niobium feedthrough 14.

The tube 11 is typically then dosed with solid and gaseous fill materials. Preferably, the the lamp is completed by filling it with a mercury-sodium amalgam. It is noted, however, that a variety of metal and metal halide fill ingredients may be used due to the direct niobium-to-ceramic sealing which allows the end temperatures to be raised to the upper temperature limit of those materials.

It is noted that substitutions in the basic chemistry of the present sealing member compositions are possible. Magnesium oxide is the classic and best grain growth inhibiting sintering aid for alumina and would therefore, remain in any alternate compositions. Several compounds, however, could be substituted for yttrium oxide, or added to the present composition to give a quaternary blend, including: scandium oxide, lanthanum oxide, praseodymium sesguioxide, europium oxide, gadolinium oxide, terbium oxide, dysprosium oxide, thulium oxide, ytterbium oxide, zirconium oxide, hafnium oxide, and thorium dioxide. Preferably, the previous compounds comprise between about 0.01 to about 5.0% by weight. Other compounds such as cerium oxide, neodymium oxide, and the remaining rare earth elements would likely perform satisfactorily from a chemical-microstructure point of view, but they would add color to the body.

The present invention will be further illustrated by the following examples which are intended to be illustrative in nature and are not to be construed as limiting the scope of the invention.

EXAMPLE I

An experiment was conducted to determine a preferred composition for translucent $Al_2O_3$ arc tube cap seal compositions. The composition of a cap seal was selected based on an evaluation of microstructure, reactivity, and bonding with $Al_2O_3$ and Nb. A series of compositions were prepared as shown in Table 1.

TABLE 1

| TRIAL ALUMINA BASE CAP COMPOSITIONS (WEIGHT PERCENT) | | | |
|---|---|---|---|
| Sample | $Y_2O_3$ | MgO | $Al_2O_3$ |
| 1 | 0.5 | 0.05 | balance |
| 2 | 1.0 | 0.05 | balance |
| 3 | 2.0 | 0.05 | balance |
| 4 | 5.0 | 0.05 | balance |

These blends were made by first dissolving yttrium nitrate and, separately, magnesium nitrate into stock methanol solutions. These solutions were assayed to determine the equivalent concentration upon drying and calcining of $Y_2O_3$ and MgO respectively. Batches calculated to total 50 gm were prepared by first weighing the appropriate quantity of high purity $Al_2O_3$ into a polyethylene jar. The appropriate concentration of the stock yttrium nitrate and magnesium nitrate solutions were added. Additional methanol was added to bring the suspension to a consistency of heavy cream (~100 centipoise). Approximately 12 alumina milling balls were added, and the suspension was rolled on a rolling mill for 1 hour to insure thorough mixing of the components. The suspension was dried in a petri dish on a hot plate using a magnetic stirring bar to insure a uniform mix through drying to thick paste consistency. The dish was placed in an oven at 70° C. until completely dry. The contents were placed in an alumina crucible and calcined for 2 hours at 1200° C. to decompose the nitrates to oxides and obtain some initial reaction of the two additives with $Al_2O_3$. The powder was then ground in a boron carbide mortar and pestle and passed through a 100 mesh nylon screen. A ½ inch diameter disc was pressed of each powder composition at 5000 psi. The discs were sintered in flowing dry $H_2$ at 1860° C. for 1 hour. X-ray diffraction found that the major second phase was $Y_3Al_5O_{12}$. The sintered dense discs were cross sectioned and polished for metallographic examination. Photographs of each sample were analyzed by lineal analysis for second phase content. The volume of second phase in ascending order was 6.2%, 9.4%, 12.6% and 26.8%. Sample 3, the 2.0% $Y_2O_3$+0.05% MgO composition, was chosen for further work because it is believed that higher concentrations may be too plastic at the sintering/sealing temperature, while lower concentrations could have insufficient liquid phase to penetrate grain boundaries and to react and bond to the $Al_2O_3$ arc tube and Nb feedthrough.

A solid rod of the Sample 3 composition was pressed isostatically at 12,500 psi. Caps of the geometry shown in FIG. 1 were machined from the unfired rod to give, upon sealing, interference fits on the fully sintered translucent $Al_2O_3$ arc tube and Nb feedthrough of 4%, 4.5%, 5%, 6%, 7%, 8%, 9%, 10%, 12% and 14%. The interferences were selected based on obtaining a hermetic bond and a crack-free component in a typical sealing cycle. It was found that the $Al_2O_3/Al_2O_3$ interface should have an 8% interference while the $Al_2O_3$/Nb interface should have a 9% interference. Later work using this type seal to make lamps showed that the interference fits could be reduced to 4% and 5% respectively, which still resulted in a hermetic seal, and had a higher yield of crack-free components. Polished sections of these seals were examined by metallography and microprobe techniques. The microstructure was found to be continuous across the original $Al_2O_3/Al_2O_3$ interface. The interface between the sealing cap and Nb exhibited interdiffusion of the components with each other, proving that a strong chemical bond was produced.

EXAMPLE II

An experiment was conducted to determine if a direct seal could be made to a 0.048 inch diameter Nb wire. A disc of Example I, Sample 3 material, 2.0% $Y_2O_3$ and 0.05% MgO, was pressed at 5000 psi. A hole was drilled having a calculated 9% interference fit, and the Nb wire was inserted in the hole. The assembly was sintered and sealed according to Example I. The seal was found to be uncracked and hermetic, based on a helium leak check. Such an assembly therefore could be utilized in constructing unique high-intensity arc discharge lamps.

EXAMPLE III

An experiment was conducted to determine if the seal composition of Example I could be used in the construction of arc tubes. Two arc tubes of the Example I, Sample 3 composition, 2.0% $Y_2O_3$ and 0.05% MgO were pressed and sintered at 1880° C. for 2 hours in flowing $H_2$. The total transmittance was only 90% and the in-line, or specular, transmittance was 1%. This is significantly below the 95-97% total and 5-7% normally achieved and considered acceptable in production. Metallography revealed very little residual porosity, but a high concentration of the second phase material, $Y_3Al_5O_{12}$. Scattering from the high concentration of the second phase material is believed to be responsible for the low transmission values. These results indicate that the preferred direct sealing member composition is not suitable for production of arc tubes. Further, the present sealing member compositions are different from the prior art describing $Y_2O_3$ and MgO sintering aid compositions for translucent PCA arc tubes.

EXAMPLE IV

An experiment was conducted to determine if the preferred composition for cap seals as shown in FIG. 1 could also be used for sealing inserts as shown in FIG. 2. A batch of Example I, Sample 3 powder (2.0% $Y_2O_3+0.05\%$ MgO, balance $Al_2O_3$) was mixed with 0.5% polyvinyl alcohol and 1.5% Carbowax binders and was spray dried in a production spray dryer. Inserts were pressed and employed in sintering regular production PCA 400 watt arc tubes. The seals were hermetic, but the second phase ($Y_3Al_5O_{12}$) migrated into the PCA arc tube wall, giving an objectionable opaque appearance.

Therefore, a series of alternative compositions were prepared as shown in Table 2.

TABLE 2

TRIAL ALUMINA BASE INSERT COMPOSITIONS (WEIGHT PERCENT)

| Sample | $Y_2O_3$ | MgO | $Al_2O_3$ |
| --- | --- | --- | --- |
| 1 | 0.05 | 0.08 | balance |
| 2 | 0.10 | 0.08 | balance |
| 3 | 0.15 | 0.05 | balance |
| 4 | 0.20 | 0.05 | balance |
| 5 | 0.25 | 0.05 | balance |
| 6 | 0.50 | 0.02 | balance |

The powder preparation was accomplished as described in Example I. Solid rods were isostatically pressed at 12,500 psi. The rods were then machined into inserts, designed to have a 5–7% interference fit, upon sintering, to full density inside a PCA tube pressed from spray dried Baikowski CR-30 $Al_2O_3$ powder, containing 0.035% $Y_2O_3+0.05\%$ MgO sintering aids. A typical sintering cycle was 1825° C. for 90 minutes in dry $H_2$ followed, without interruption, by 90 minutes in $H_2$ that was bubbled through 23° C. $H_2O$. Heating and cooling rates were 17° C./min. The samples were examined, with back lighting, for continuity of seal over the entire seal area. Further, representative seals were sectioned longitudinally and horizontally, polished, and examined metallographically. Intermittent seal voids were detected on the Sample 1 and 2 (0.05 and 0.10% $Y_2O_3$) compositions. The higher $Y_2O_3$ weight percent compositions had no detected voids, a continuous microstructure across the original interface, and varying concentration of second phase migration into the PCA tube wall, scaling with $Y_2O_3$ content. In general, the grain size was larger in the insert than in the PCA wall, with 39 μm and 29 μm being typical grain sizes for the respective components. The large grains in the insert were approximately the same size as the large grains in the arc tube wall. Since the large grains are thought to be the origin of the strength-limiting flaws, the microstructure of the insert should be nearly equal in strength to the PCA arc tube.

EXAMPLE V

An experiment was conducted to compare the strength of the various sealing member compositions.

Four-point bend strength tests were conducted at ambient temperature and atmosphere to compare strength results with standard PCA. The results are shown in Table 3.

TABLE 3

STRENGTH COMPARISON OF INSERT/SEAL COMPOSITIONS

| $Y_2O_3$ (wt %) | MgO (wt %) | Grain Size (μm) | Strength (ksi) |
| --- | --- | --- | --- |
| 0.05 | 0.05 | 25.5 | 39.6 ± 1.3 |
| (Standard PCA) | | | |
| 0.10 | 0.08 | 31.1 | 29.2 ± 1.0 |
| 0.15 | 0.05 | 23.4 | 35.8 ± 1.7 |
| 0.15 | 0.05 | 15.5 | 35.6 ± 1.2 |
| 0.15 | 0.05 | 24.2 | 32.4 ± 1.5 |
| 0.15 | 0.05 | 27.0 | 32.3 ± 1.0 |
| 2.00 | 0.05 | 11.0 | 36.1 ± 1.1 |

The higher $Y_2O_3$ compositions were slightly weaker than the standard PCA in this test format. This could be partially due to grain size and porosity differences. The reported grain sizes are the average grain sizes, whereas the largest grain sizes may be the controlling feature. It is noteworthy that the smaller grain sizes in the 0.15% $Y_2O_3$ compositions had the higher strengths for the series, and the small grain size (15 min. sintering time) 2.0% $Y_2O_3$ was also high strength.

EXAMPLE VI

One of the groups of Example V was tested for thermal shock resistance under aggressive second seal thermal cycles designed to crack some, but not all, of the arc tubes. The higher weight percent $Y_2O_3$ inserts were compared with a control group of standard PCA inserts processed at the same time. Four different thermal cycles were employed with increasing severity. This test is reported in Table 4.

TABLE 4

COMPARISON OF THERMAL SHOCK RESISTANCE

| | Percentage Cracked | |
| --- | --- | --- |
| Cycle | High $Y_2O_3$ | Standard |
| 1 | 10.5 | 15.8 |
| 2 | 15.8 | 21.1 |
| 3 | 41.8 | 45.5 |
| 4 | 78.9 | 78.9 |

Based on this test, the high weight percent $Y_2O_3$ inserts have a thermal shock resistance that is at least as good as the standard inserts. Either the slightly lower strength observed in Table 3 is too small to show up in a thermal shock test, or the processing of the high weight percent $Y_2O_3$ insert and the tube together results in a higher strength microstructure. It is concluded that the high weight percent $Y_2O_3$ hermetic insert was suitable mechanically for this application.

These examples demonstrate that an alumina arc tube sealing member may be formed which permits fabrication of sintered hermetic seals to a translucent alumina arc tube, without the use of sealing frits or brazing alloys. The sealing member also facilitates construction of a hermetic insert in a PCA tube that employs frit in the final sealing of the niobium feedthrough assembly. These compositions allow for formation of sealing members which are similar in strength to the standard PCA sealing members, and have minimal interference fits. The compositions also provide strong mechanical and chemical bonds with both the alumina arc tube and niobium feedthrough. Within the scope of the invention, different compositions are required for cap seals and for sealing inserts. It is noted that the present sealing member compositions are not suitable for formation of PCA arc tubes.

Alternate seal construction designs and sequences are possible, centered around the general theme of a hermetic high temperature seal formed during or after sintering of the PCA arc tube.

Although particular embodiments of the invention have been described in detail for purposes of illustration, various modifications may be made without departing from the spirit and scope of the present invention. Accordingly, the invention is not to be limited except by the amended claims.

What is claimed is:

1. An alumina arc tube sealing member comprising between about 95.0 to about 99.9 percent by weight of highly pure fine alumina doped with between greater than about 1.0 to about 5.0 percent by weight of yttrium oxide, and between about 0.02 to about 0.25 percent by weight of magnesium oxide, said sealing member being high-density, hermetically tight and having very little residual porosity.

2. The alumina arc tube sealing member of claim 1 further comprising at least one component selected from the group consisting of scandium oxide, lanthanum oxide, praseodymium sesquioxide, europium oxide, gadolinium oxide, terbium oxide, dysprosium oxide, thulium oxide, ytterbium oxide, zirconium oxide, hafnium oxide, and thorium dioxide.

3. The alumina arc tube sealing member of claim 1 wherein said member is a cap seal comprising between 2.0 to about 3.0 percent by weight of yttrium oxide and between about 0.05 to about 0.1 percent by weight magnesium oxide.

* * * * *